United States Patent
Burch

(10) Patent No.: US 6,751,573 B1
(45) Date of Patent: Jun. 15, 2004

(54) PERFORMANCE MONITORING IN DISTRIBUTED SYSTEMS USING SYNCHRONIZED CLOCKS AND DISTRIBUTED EVENT LOGS

(75) Inventor: Jefferson B. Burch, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/480,041

(22) Filed: Jan. 10, 2000

(51) Int. Cl.[7] .............................................. G06F 15/00
(52) U.S. Cl. ..................... 702/178; 702/187; 702/188; 370/473; 370/478; 713/502
(58) Field of Search .................. 702/178, 182–183, 702/187–188; 375/130, 222; 713/400, 502, 503; 700/14–16; 370/473, 516, 478, 479, 498

(56) References Cited

U.S. PATENT DOCUMENTS

| | | | |
|---|---|---|---|
| 5,566,180 A | * 10/1996 | Eidson et al. | 370/473 |
| 5,805,442 A | * 9/1998 | Crater et al. | 700/9 |
| 5,828,876 A | * 10/1998 | Fish et al. | 710/200 |
| 6,009,530 A | * 12/1999 | Goatly | 713/502 |
| 6,205,362 B1 | * 3/2001 | Eidson | 375/130 |

FOREIGN PATENT DOCUMENTS

EP    0585479    8/1992

OTHER PUBLICATIONS

Alan Mink et al—"Multiprocessor Performance–Measurement Instrumentation"; Computer, IEEE Computer Society, Los Alamitos., CA, U.S.; vol. 23, No. 9, Sep. 1990; pp. 63–75.

Paul Ashton et al—"A Tool For Visualizing The Execution Of Interactions On A Loosely–Coupled Distributed System", Software—Practice and Experience, vol. 25, No. 10; Oct. 1995; pp. 1117–1140.

* cited by examiner

*Primary Examiner*—Bryan Bui

(57) ABSTRACT

A distributed system that provides performance monitoring capability across multiple nodes of a distributed application. A distributed system according to the present techniques includes a set of nodes that communicate via a network. A distributed application is performed by a set of cooperating node applications executing in the nodes. The distributed system implements techniques for generating time-stamp records for each of a set of significant events associated with one or more of the node applications. The time-stamp records provides a synchronized time base across the nodes for the significant events thereby enabling temporal ordering of the significant events.

19 Claims, 5 Drawing Sheets

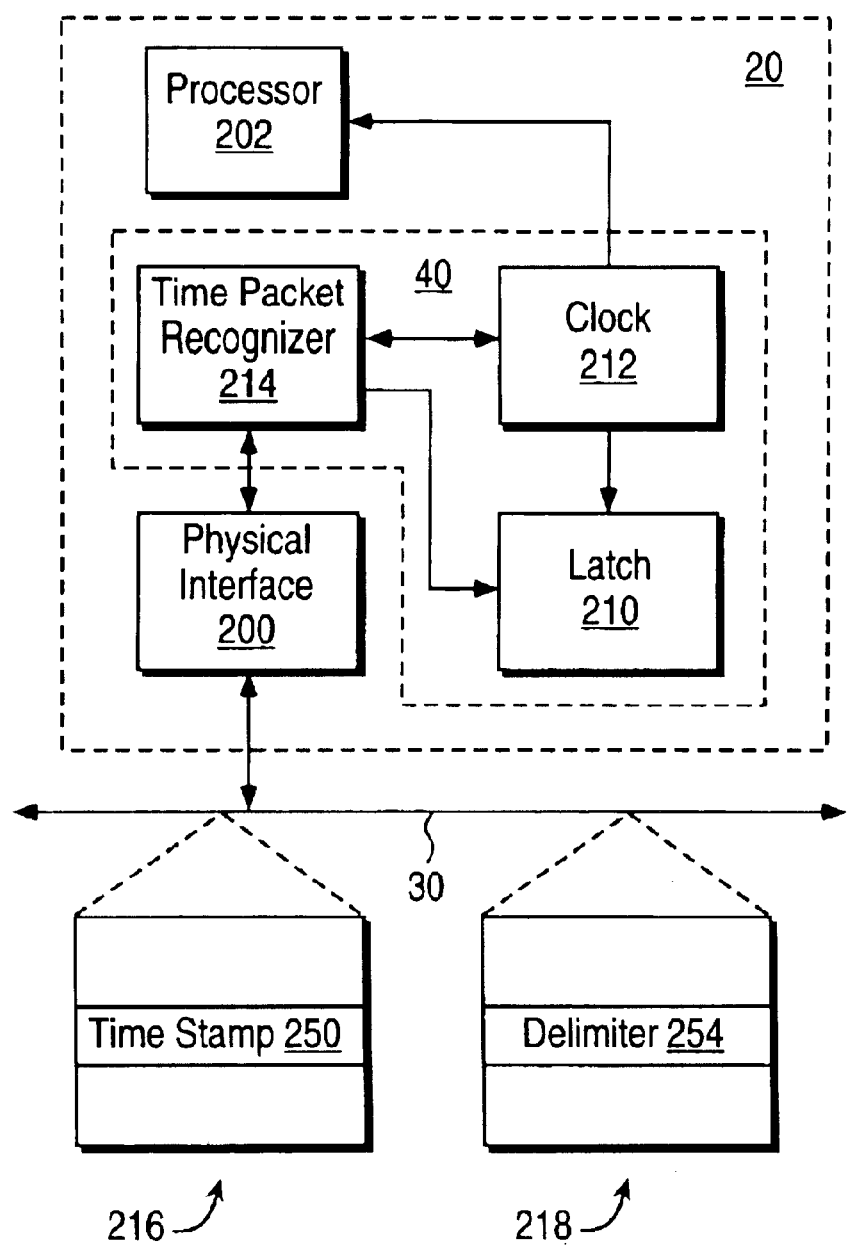

PERFORMANCE MONITORING IN DISTRIBUTED SYSTEMS USING SYNCHRONIZED CLOCKS AND DISTRIBUTED EVENT LOGS

BACKGROUND OF THE INVENTION

1. Field of Invention

The present invention pertains to the field of distributed systems. More particularly, this invention relates to performance monitoring in distributed systems using synchronized clocks and distributed event logs.

2. Art Background

Distributed systems are commonly employed in a variety of applications. A typical distributed system includes a set of nodes that communicate via a communication network. One or more of the nodes usually include processing resources that execute software for a distributed application. Examples of distributed applications include web client-server applications, groupware applications, and industrial and other types of control systems.

A distributed application may be viewed as a arrangement of software components that are distributed among the nodes of a distributed system. Examples of software components of a distributed application include processes, file systems, database servers, web servers, client applications, server applications, network components, and sensor, actuator, and controller applications. Such software components typically interact with one another using mechanisms such as function calls, messages, HTTP commands, etc., to name a few examples. An interaction between software components of a distributed application may be referred to as an event.

Events that are generated in one location of a distributed application typically cause events to occur at other locations in the distributed application. In a web-based application, for example, an end-user may click a button in a web browser. The click typically generates events in the form of HTTP commands. Each HTTP command in turn usually generates other events at other locations in the distributed application to communicate the HTTP command to a web server, for example via a TCP/IP link established by the protocol stacks in each node. In response, a web server as the remote portion of the distributed application typically generates events such as SQL statements for database access or events for file system access to carry out the HTTP command as well as events to return the appropriate information to the requesting web browser.

A capability to record the timing of events in a distributed application may be useful for a variety of system management tasks such as performance monitoring, diagnosis, and capacity planning. For example, a record of the timing of events may be useful for identifying bottlenecks in a distributed application that hinder overall performance. Unfortunately, prior methods for performance monitoring usually record the timing of events in a single node. Prior methods typically do not provide event timing across multiple nodes of a distributed application.

SUMMARY OF THE INVENTION

A distributed system is disclosed that provides performance monitoring capability across multiple nodes of a distributed application. A distributed system according to the present techniques includes a set of nodes that communicate via a network. A distributed application is performed by a set of cooperating node applications executing in the nodes. The distributed system implements techniques for generating time-stamp records for each of a set of significant events associated with one or more of the node applications. The time-stamp records provides a synchronized time base across the nodes for the significant events. This enables temporal ordering of the significant events.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 5 shows a synchronized clock in one embodiment of a node.

DETAILED DESCRIPTION

Figure 1:
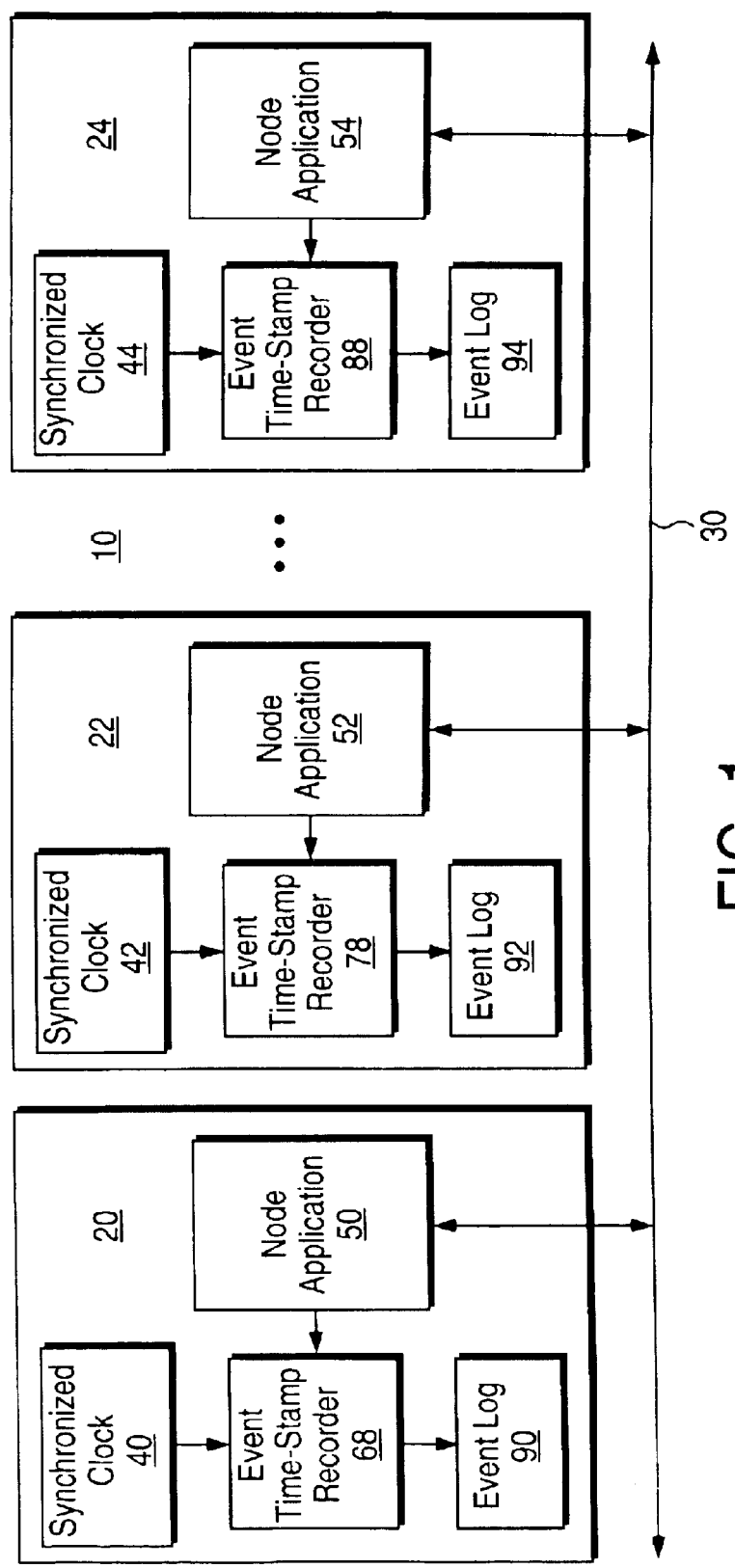
FIG. 1 shows a distributed system that includes the performance monitoring techniques disclosed herein.

FIG. 1 shows a distributed system 10 that includes the performance monitoring techniques disclosed herein. The distributed system 10 includes a set of nodes 20–24 that communicate via a network 30. Each of the nodes 20–24 include processor resources for executing a set of node applications 50–54, respectively.

The node applications 50–54 interact via the communication network 30 when performing a distributed application in the distributed system 10. The distributed application performed by the node applications 50–54 may be any type of distributed application such as web-based client-server applications including those used in e-commerce, groupware applications, order processing applications, or inventory management applications to name a few examples. In addition, the distributed application performed by the node applications 50–54 may be a control system application in which the nodes 20–24 include the appropriate control system hardware including sensors and actuators.

In one embodiment, each of the nodes 20–24 each include a corresponding synchronized clock 40–44. The synchronized clocks 40–44 maintain time values which are synchronized with respect to one another. These synchronized time values enable the coordination of event timing measurements throughout a distributed application in the distributed system 10.

The nodes 20–24 each implement a corresponding event time-stamp recorder function 68, 78, and 88. Each event time-stamp recorder function 68, 78, and 88 is call-able by the corresponding node application 50–54. Each event time-stamp recorder function 68, 78, and 88 when called obtains a time value from the corresponding synchronized clock 40–44 and writes the time value and an event code provided by the corresponding node application 50–54 into a corresponding event log 90–94 as a time-stamp record.

Applications in nodes that do not have synchronized clocks can also be monitored. For example, companion nodes may be associated with the nodes that do not have synchronized clocks. Events of interest on the nodes that do not have synchronized clocks are time-stamped and recorded using the corresponding companion nodes. Communication paths to companion nodes can be a physical wire, serial or parallel communication path, etc. In one embodiment, event codes from an application executing on a node that does not have a synchronized clock is passed to the event time-stamp recorder on its companion node over the communication path to the companion node. Event logs may be implemented on either node.

The information recorded in the event logs 90–94 may be read by any of the nodes 20–24 or other nodes reachable via the network 30. This information may be used to determine a variety of performance indications for the distributed application performed by the node applications 50–54. The information may be used to construct graphical displays that indicate timing associated with a side of predetermined events of interest in a distributed application.

In one embodiment, the time values in the synchronized clocks 40–44 are synchronized using a synchronization protocol described in U.S. Pat. No. 5,566,180.

In another embodiment, the nodes 20–24 implement the network time protocol (NTP). In accordance with NTP, the nodes 20–24 periodically exchange messages via the network 30. Each message contains a time value from the synchronized clock 40–44 of the node 20–24 that originated the message. In response, each node 20–24 adjusts its corresponding synchronized clock 40–44. Eventually, the synchronized clocks 40–44 in the nodes 20–24 converge to synchronized time values.

The network 30 may be a packetized network such as Ethernet or a network such as LonTalk which is adapted to control systems. Alternatively, the network 30 may be implemented as a serial or parallel communication bus or other mechanism for communication.

Figure 2:
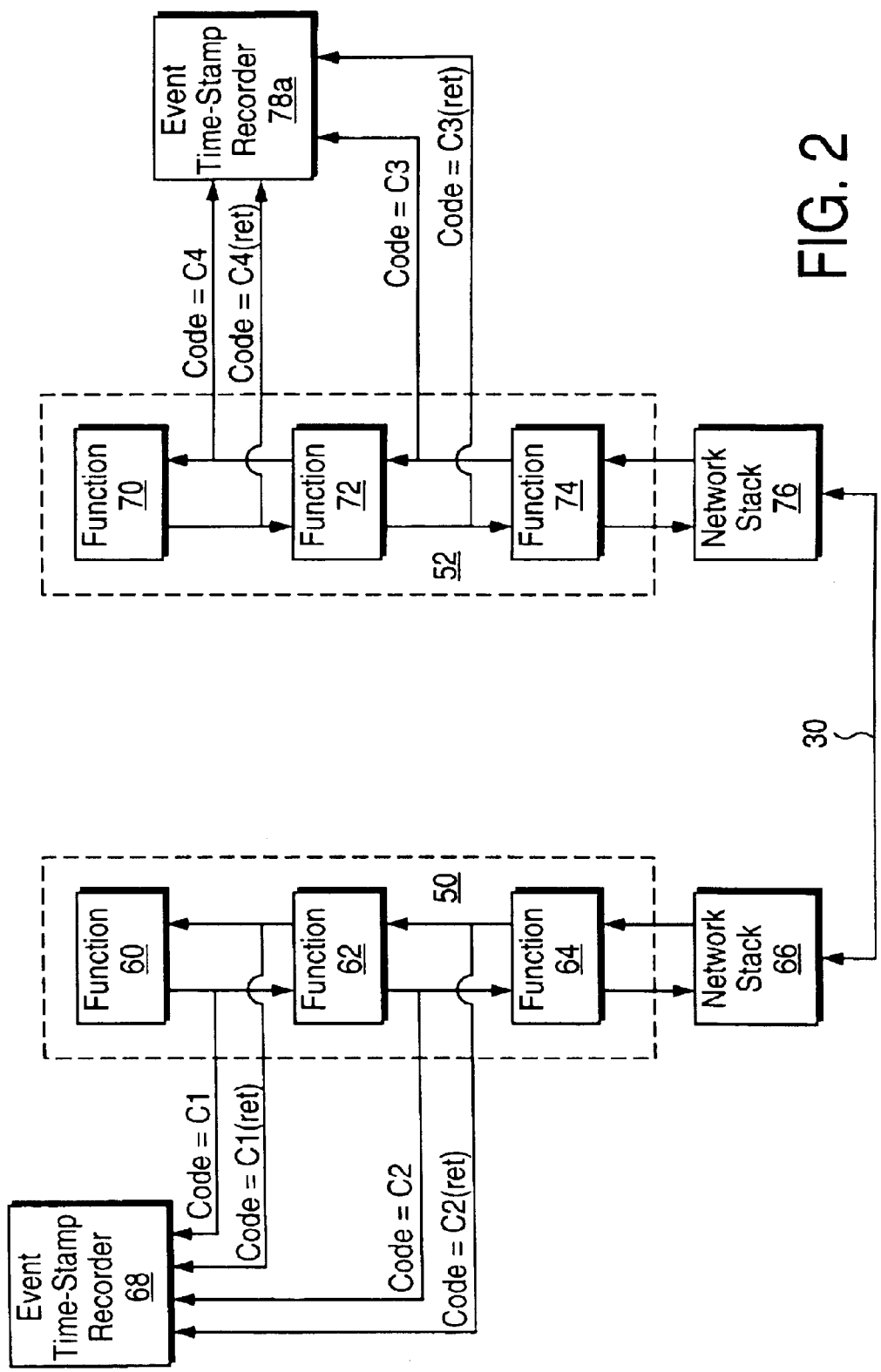
FIG. 2 illustrates the capture of time-stamp records for events associated with the node applications.

FIG. 2 illustrates the capture of time-stamp records for events associated with the node applications 50–52. The node application 50 includes a set of functions 60–64 which are application-specific and a network stack 66 that performs communication via the network 30. Similarly, the node application 52 includes a set of functions 70–74 which are application-specific and a network stack 76 that performs communication via the network 30.

The particulars of the functions 60–64 and 70–74 depend on the particular distributed application performed by the node applications 50–52. For example, the functions 60–64 may be associated with a web browser application and the functions 70–74 may be associated with a web server application. The network stacks 66 and 76 bridge the underlying physical network 30 to the node applications 50–52.

The application 50 is designed such that a call to the function 62 by the function 60 is deemed an 19 event of significance in the execution of the corresponding distributed application. As a consequence, the function 60 calls the event time-stamp recorder function 68 near the time of the call to the function 62. The function 60 passes an event code=c1 parameter with the call to the event time-stamp recorder function 68. In response, the event time-stamp recorder function 68 reads a time value (t1) from the synchronized clock 40 and writes the value-pair c1-t1 to an entry in the event log 90 as a In addition, a call to the function 64 by the function 62 is deemed an event of significance in the execution of the corresponding distributed application. As a consequence, the function 62 calls the event time-stamp recorder function 68 near the time of the call to the function 64 and passes an event code=c2 parameter with the call to the event time-stamp recorder function 68. In response, the event time-stamp recorder function 68 reads a time value (t2) from the synchronized clock 40 and writes the value-pair c2-t2 to an entry in the event log 90 as a time-stamp record.

A call by the function 74 to the function 72 is deemed a significant event and a call is made to the event time-stamp recorder function 78 with an event code=c3 parameter. In response, the event time-stamp recorder function 78 reads a time value (t3) from the synchronized clock 42 and writes the value-pair c3-t3 to an entry in the event log 92 as a time-stamp record.

A call to the function 70 by the function 72 is deemed an event of significance and the function 72 calls the event time-stamp recorder function 78 near that time and passes an event code=c4 parameter with the call. In response, the event time-stamp recorder function 78 reads a time value (t4) from the synchronized clock 42 and writes the value-pair c4-t4 to an entry in the event log 92 as a time-stamp record.

In some embodiments, the function 70 may respond to the above sequence by calling the function 72, which calls the function 74, which calls the network stack 76 to transfer a message back to the node application 50 on up to the function 60. This provides an event loop which is originated by the node application 50 and completed by the node application 52 with the reply being returned to the node application 50. On the return path, different codes may be recorded in the event logs along the function call chain.

In an example embodiment, the node application 50 is a web browser and the node application 52 is a web server. The function 60 generates HTTP commands as events and time values for these events recorded by the event time-stamp recorder function 68. HTTP commands received by the node application 52 that require a database access cause the function 70, a database access function, to be called and time-stamp records for these events are recorded by the event time-stamp recorder function 78. Similarly, the event time-stamp recorder function 78 records when the function 70 completes a database access and the event time-stamp recorder function 68 records when the results are provided back to the function 60 to complete a web browser-web server transaction loop.

In some time critical cases, hardware in a node automatically records a time-stamp for a significant event, for example the time of data collection for a sensor or time of arrival of a network message. This time-stamp can be passed to an event time-stamp recorder along with the desired code to be stored in an event log.

Tables 1 and 2 show examples of information recorded in the event logs 90 and 92, respectively, for the example sequence described above.

TABLE 1

| Event Code | Time-stamp |
| --- | --- |
| c1 | t1 |
| c2 | t2 |
| c2 (ret) | t7 |
| c1 (ret) | t8 |

TABLE 2

| Event Code | Time-stamp |
| --- | --- |
| c3 | t3 |
| c4 | t4 |
| c4 (ret) | t5 |
| c3 (ret) | t6 |

This sequence of entries written in to the event logs 90 and 92 may be viewed as corresponding to a series of states S1 through S8 in the distributed application performed by the node applications 50–52. The states S1 through S4 correspond to the event codes-value pairs C1-t1, C2-t2, C3-t3, and C4-t4, respectively. The states S5 through S8 correspond to the event codes-value pairs C4(ret)-t5, C3(ret)-t6, C2(ret)-t7, and C1(ret)-t8, respectively.

TABLE 3

Table 3 aggregates the information recorded in the event logs 90 and 92, respectively, for the example sequence described above.

| State Number | Node | Event Code | Time-Stamp |
|---|---|---|---|
| S1 | 20 | C1 | T1 |
| S2 | 20 | C2 | T2 |
| S3 | 22 | C3 | T3 |
| S4 | 22 | C4 | T4 |
| S5 | 22 | C4 (ret) | T5 |
| S6 | 22 | C3 (ret) | T6 |
| S7 | 20 | C2 (ret) | T7 |
| S8 | 20 | C1 (ret) | T8 |

Figure 3:
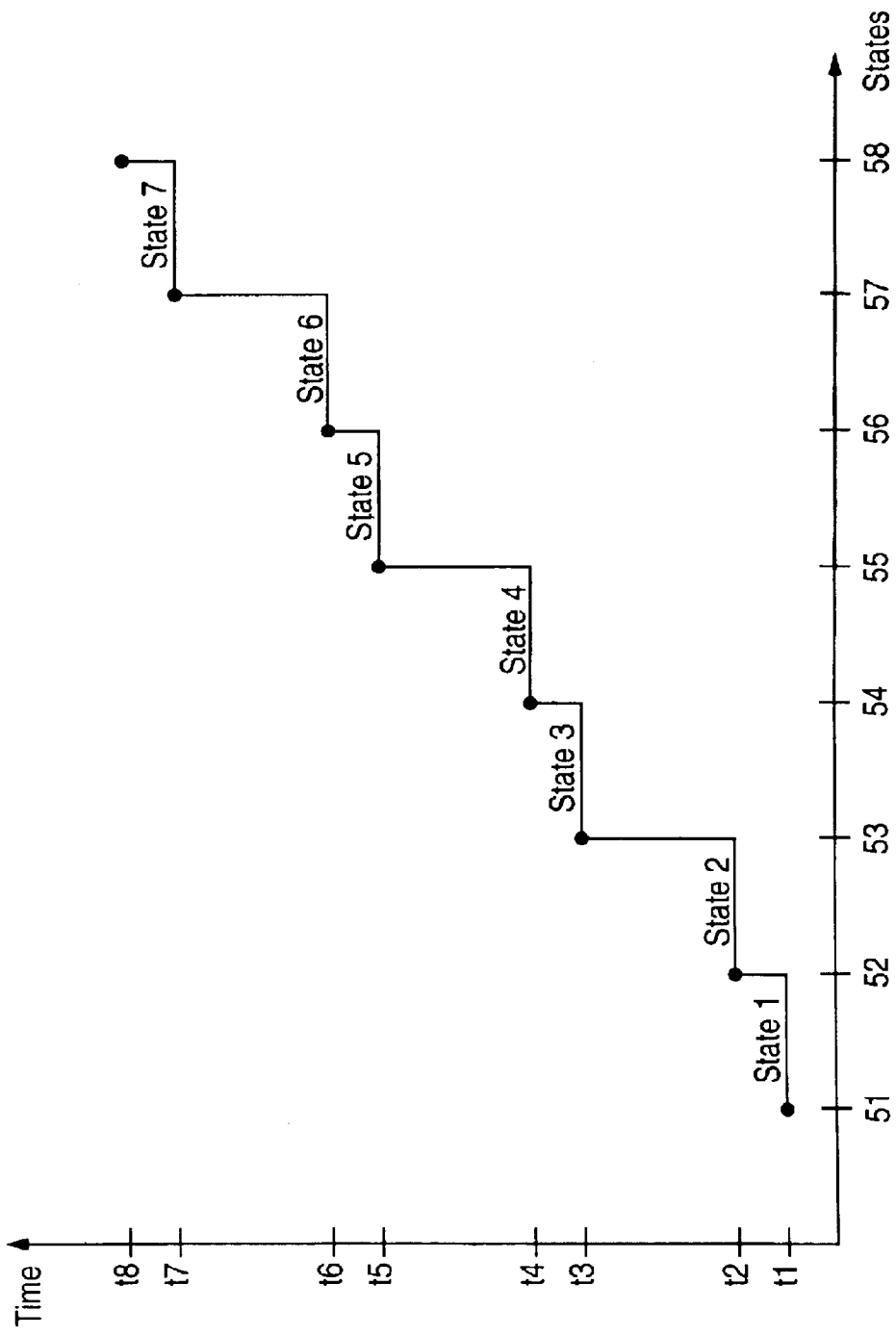
FIG. 3 is a graph constructed from the captured time-stamp records with their synchronized time base.

FIG. 3 is a graph constructed from the information obtained from the event logs 90–92. The states S1 through S8 are shown plotted against the corresponding time values t1 through t8. The time values t1 through t8 which were obtained from the synchronized clocks 40–42 provide a synchronized time base for analyzing the timing of the states S1 through S8 even though these states represent events that occur in the separate nodes 20 and 22.

An examination of the graphs shows that the highest latency in the states S1 through S8 occur between states S2 and S3, between states S4 and S5, and between states S6 and S7. The transitions between states S2 and S3 and between states S6 and S7 correspond to the latency of message transfer via the network 30. The transitions between states S4 and S5 correspond to the latency of the function 70 which in the example embodiment is a database lookup.

Figure 4:
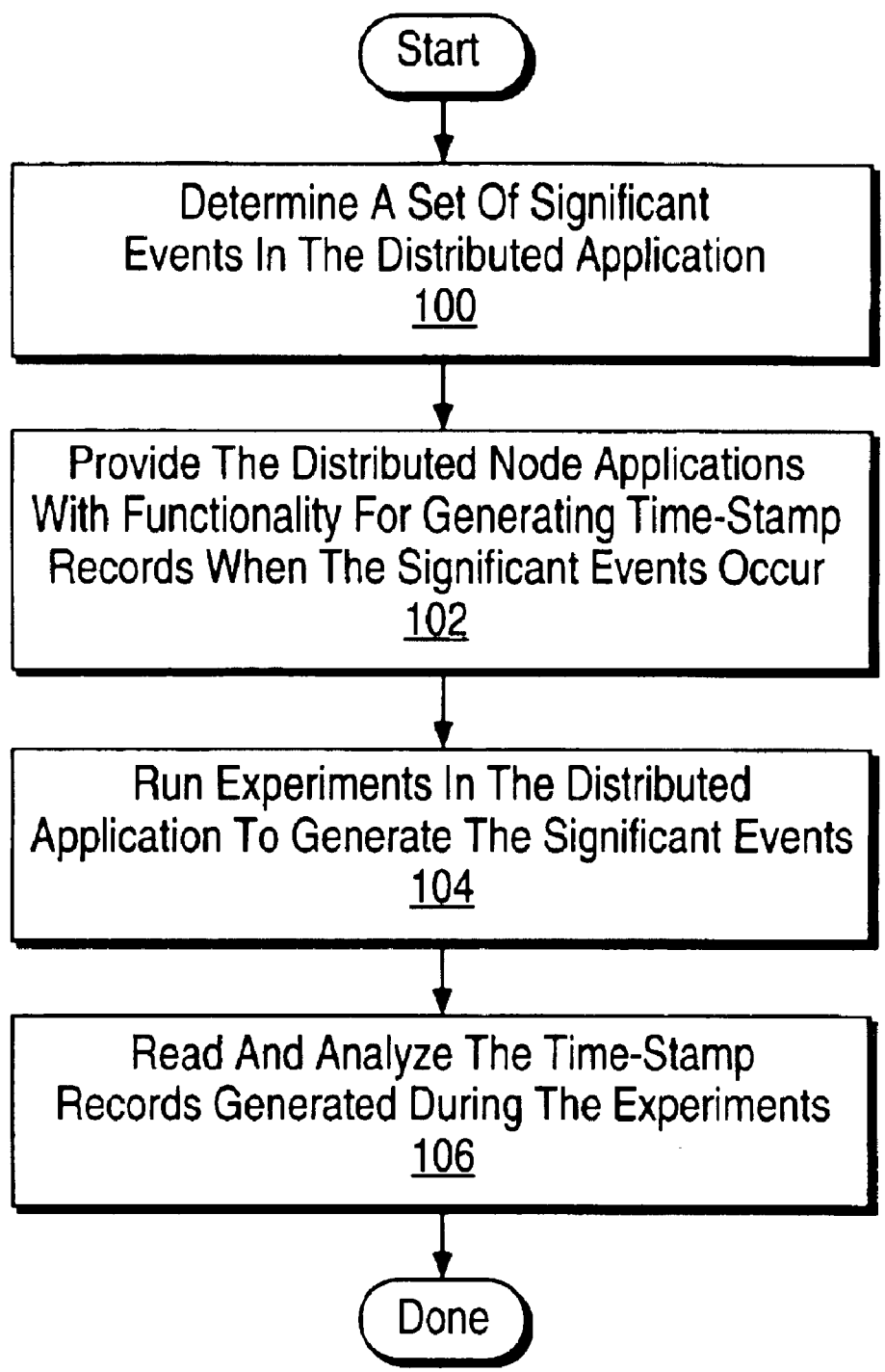
FIG. 4 shows a method for performance monitoring in a distributed application using the techniques disclosed herein.

FIG. 4 shows a method for performance monitoring in a distributed application using the techniques disclosed herein. At step 100, a set of significant events in the distributed application are determined. The significance of an event is generally application-specific. For the example above, the significant events are the generation of HTTP commands, the transmission and receipt of messages on the network 30, and database accesses for responses to the HTTP commands. For a distributed control application, as another example, the significant events may be the generation of control values, the receipt of sensor data, and the application of control values to actuators, etc.

At step 102 the ditributed node applications that perform the distributed application are provided with functionality for creating time-stamp records in their corresponding event logs when the significant events occur. In the example above, the node applications 50–54 are provided with the event time-stamp recorder functions 68, 78, and 88, respectively, that read the corresponding synchronized clocks 40–44 and log entries in the event logs 90–94. Alternatively, one or more of the functions 60–64 and 70–74 and the network stacks 66 and 76 may directly read the synchronized clocks 40–44 and directly write entries in the event logs 90–94 or there functions may be performed in hardware and/or on companion nodes.

At step 104, one or more experiments are run in the distributed application to generate the significant events and capture time-stamp records. In the example above, HTTP commands are generated using the node application 50 and are processed by the node application 52, thereby generating significant events which are recorded in the event logs 90–92. Event loops such as the states S1 through S8 may be executed a large number of times to gather time-stamp records.

At step 106, the time-stamp records captured during step 104 are read and analyzed. In the example above, the time-stamp records are read from the event logs 90–94. Any computer system or node, etc. having access to the network 30, including the nodes 20–24, may read and analyze the time-stamp records. Graphs may be generated such as the one in FIG. 3 or other type of graph. For example, time-stamp records from multiple loops through the states S1 through S8 may be overlaid on a graph and/or may be used to generate statistical distributions of time values associated with transitions among the states S1 through S8.

FIG. 5 shows the synchronized clock 40 in one embodiment of the node 20. The synchronized clocks 42–44 may be implemented in a similar manner. The synchronized clock 40 includes a time packet recognizer 214, a clock 212, and a latch 210. The node 20 includes a physical interface 200 that enables transmission and reception of packets via the network 30. The physical interface 200 provides received packets to the time packet recognizer 214.

In this embodiment, the synchronized clock 40 maintains synchronized time in response to timing data packets and follow up packets which are transferred via the network 30. For example, a timing data packet 218 and a follow up packet 216 are carried on the network 30. The timing data packet 218 and the follow up packet 216 are generated by a master clock on the network 30. The master clock may be contained in one of the nodes 22–24 or on another node reachable via the network 30. The master clock may be a real-time clock.

The timing data packet 218 includes a delimiter 254 that identifies it as a timing data packet for the synchronization protocol of the synchronized clock 40. The follow up packet 216 includes a time stamp 250. The time stamp 250 indicates the local time in the master clock when the timing data packet 218 was generated.

The time packet recognizer 214 receives the timing data packet 218 through the physical interface 200. The time packet recognizer 214 detects a unique timing point in the recovered bit stream for the timing data packet 218. Upon detection of the unique timing point, the time packet recognizer 214 causes the latch 210 to latch a time value from the clock 212. The time value held in the latch 210 indicates the local time at which the time packet recognizer 214 received the timing data packet 218. Thereafter, the time packet recognizer 214 receives the follow up packet 216 and extracts the time stamp 250. The difference between the time stamp 250 and the time value in the latch.210 indicates the relative synchronization of the master clock and the clock 212. Once this difference is computed by the processor 202 it is used to adjust the time value in the clock 212 to conform it to the master clock.

The adjustment of the time value in the clock 212 may be accomplished by implementing the clock 212 as a counter driven by an oscillator with sufficient stability. The least significant few bits of the counter may be implemented as an adder so that an increment on oscillator periods may be occasionally increased or decreased to effectively speed up or slow down the clock 212 in accordance with the results of the computation of the difference between the time stamp 250 and the time held in the latch 210. The processor 202 when executing the event time-stamp recorder function 68 reads the contents of the clock 212 to obtain time-stamps.

As a distributed application executes, the present teachings yield a set of time-stamp records in each node involved in the distributed application. Synchronized clocks in each node provide a synchronized time base that allows temporal ordering of the time-stamp records. This information is the basis for performance analysis of the end-to-end distributed application. In addition to summary statistical performance metrics (e.g. average end-to-end latency) details on individual distributed transactions can be captured with this system.

From the time-stamp records, an individual transaction can be analyzed to elucidate why it deviates from the norm. This detailed information provides key insights to software engineers and system programmers to understand the overall behavior of the distributed application.

Because this technique quickly identifies performance bottlenecks across the distributed system, engineering resources can be focused on the areas to optimize, tune, and/or redesign software/hardware. The resulting improvements can be monitored and analyzed with the present techniques to assess the real benefits of the changes and to focus engineering activities for the next round of improvements.

Through an iterative process of using the present techniques to identify performance bottlenecks and then focusing engineering resources to remove those bottlenecks, the performance of the distributed application can be subsequently improved.

An event time-stamp recorder can run in two modes including one in which a time-stamp and code are provided by application (usually by the hardware), and one in which a time-stamp is read by the event time-stamp recorder as it processes the code from the application.

In some embodiments, the event code of interest is presented to the application along with a time-stamp. In this embodiment, an event time-stamp recorder stores both the event code and time-stamp and does not read a local clock. For example, a measurement node in a distributed measurement and control system automatically generates a time-stamp when a measurement is made. If the application finds this measurement of interest, it passes the appropriate event code and time-stamp to an event time-stamp recorder for storage.

The present techniques provide the ability to analyze repetitions of a sequence of distributed transactions. Because time-stamp records from each repetition are captured, it is very useful to analyze how all the repetitions compare. For example, statistical descriptions of the complete transaction such as the average delay for a transaction, the maximum delay, the minimum delay, and the statistical distribution (i.e. histogram).

A pair states may be selected and the delay between them analyzed. This provides a portion of the delay for the entire transaction and similar in-formation such as average, max, min, and distribution may be calculated.

The fact the present techniques yield a time-stamp for of every state across a distributed application provides more information in comparison to other measurement techniques. This makes it possible to analyze the statistical distribution over and above a simple average.

It may be useful is to examine what is happening on different nodes. One goal of distributed applications is to allow all the nodes to perform useful work at the same time (e.g parallel execution). While the server is working, the client is also performing some useful activity. The events and time-stamps from the different nodes yielded by the present techniques enable the generation of diagrams that describe how much parallel work is really occurring.

In addition to providing time-stamps, the synchronized clock mechanisms disclosed herein also provide detailed statistics on how tightly synchronized a slave clock is to the remote master clock. One statistic that is available is the local clock offset Due to the nature of the synchronization algorithm in some embodiments (a digital software servo algorithm) this value will vary between the synchronization bounds. An event time-stamp recorder can store this offset along with the time-stamp. In a post processing phase, this new information can be used when comparing time-stamps from different nodes. This may be viewed as time-stamp confidence limits on the stair-step plots. This yields a visual indication if two events are too close together to differentiate which came first.

Companion nodes when used are preferably in close proximity to the corresponding nodes and communicate using a low latency mechanism such as a wire or parallel port, etc.

The companion node may be very simple and contain just a synchronized clock. A node sends a signal to the companion node and receive back the current time-stamp. All the buffer management functions would be on the other node. This is useful when the other node is a full participant in the present techniques but does not have a synchronized clock. For example, the other node may be a PC or network server.

Alternatively, companion nodes may have synchronized clocks and all the buffer management function. The other node sends the event code. The companion node then performs the time-stamp function, buffer management, etc. The code may be via a separate digital or analog wire with the companion node making a measurement of the behavior of the other node.

It is preferable that the communication latency between the a node and its companion node be kept to a minimum.

The event logs 90–94 may be organized in a circular fashion (circular queue). During data gathering, the event logs 90–94 fill and new time-stamp records replace the oldest time-stamp records in the event logs 90–94. If one of the nodes 20–24 recognizes a deviant situation such as a long round trip for a network transaction it can quickly sends messages out to all the participant nodes preferably using a multi-cast message on the network 30. This message includes a begin time and duration of interest. All participant nodes use this information to lock down those sections of there corresponding event buffers 90–94 so that they are not overwritten with new time-stamp records. Thereafter, the locked down portions of the event buffers 90–94 may be retrieved for post analysis. As the locked down portions are retrieved, the corresponding node 20–24 node may unlock those portions of the corresponding event buffer 90–94 and continue to gather time-stamp records. This is particularly useful in application where significant events are infrequent. The nodes 20–24 are configured to watch for a signification event and when it is detected all the other nodes 20–24 get notified.

It is preferable that event logs 90–94 are large enough to store all the interesting events over the fetch phase of the post process interval plus a safety margin to hold all the events that have recently come in. The safety margin is sized such that each node will have sufficient time to perform the determination of whether an event is interesting and to send out the lock down message. The transit time and processing time for the lock down message should also be considered.

The present techniques may introduce slight delays in the execution of the distributed application. This delay may be measured using the present techniques and the delays removed in the post processing phase. To perform this correction, an application would execute a correction loop such as the following;

```
For (I = 0; 1 < 10000; I++) {
    EventLog (startCorrectionCode);
    EventLog (endCorrectionCode);
}
```

The time-stamps from these pairs of time-stamp records can be subtracted and then analyzed to obtain an understanding of the average delay, the maximum delay, the minimum delay, and the statistical distribution of delays. These facts can be used to correct the post analysis results of the full distributed application.

Because these delays may vary as the distributed application runs, the application programmer may enter two back to back calls to the EventLogo ( ) function as illustrated above at some point in the application. At the expense of event log space, the difference in these two time-stamps may be used to verify the timing overhead of the present techniques. It is preferable that the EventLogo ( ) be efficient and its execution time be much shorter than the running distributed application.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method of performance monitoring in a distributed system, comprising the steps of:

determining a set of significant events that are to be monitored in a distributed application in the distributed system;

providing each of a set of nodes applications associated with the significant events with a recorder function which when called generates a record that identifies the corresponding significant event and includes a time-stamp for the corresponding significant event obtained from a corresponding synchronized clock;

running an experiment in the distributed application that generates one or more of the significant events;

obtaining the records from the node applications and analyzing the records.

2. The method of claim 1, wherein each record includes an event code associated with the corresponding significant event.

3. The method of claim 1, wherein the step of analyzing the records comprises the step of generating a graphical representation of the records.

4. The method of claim 1, further comprising the step of determining a set of delays in execution of the node applications associated with the generation of the records.

5. The method of claim 4, further comprising the step of correcting the records in response to the delays.

6. A distributed application, comprising:

a set of node applications which communicate via a network, each node application having at least one function which is associated with a significant event in the distributed application and further having a recorder function which when called by the function obtains a time-stamp for the significant event from a corresponding synchronized clock;

event log for each node application, each event log for holding a record of the corresponding significant event and time-stamp such that the time-stamps provide a synchronized time base in the distributed application for evaluating the significant events.

7. The distributed application of claim 6, wherein each function generates an event code which identifies the corresponding significant event.

8. The distributed application of claim 7, wherein each recorder function obtains the event code from the corresponding function and writes the event code into the corresponding event log along with the corresponding time-stamp.

9. The distributed application of claim 6, wherein one or more of the node applications executes on a node that includes the corresponding synchronized clock.

10. The distributed application of claim 6, wherein one or more of the node applications executes on a node that is connected to a companion node that includes the corresponding synchronized clock.

11. The distributed application of claim 6, further comprising means for obtaining the records from the event logs via the network and analyzing the records using the synchronized time base.

12. The distributed application of claim 6, further comprising means for starting and stopping the recording of records in one or more of the event logs.

13. The distributed application of claim 6, wherein one of the significant events is a generation of an HTTP command in the distributed application.

14. The distributed application of claim 6, wherein one of the significant events is a transmission of a message on the network.

15. The distributed application of claim 6, wherein one of the significant events is a receipt of a message on the network.

16. The distributed application of claim 6, wherein one of the significant events is a database access.

17. The distributed application of claim 6, wherein one of the significant events is a generation of a control value in the distributed application.

18. The distributed application of claim 6, wherein one of the significant events is a receipt of sensor data.

19. The distributed application of claim 6, wherein one of the significant events is an location of a control value to an actuator.

* * * * *